United States Patent [19]
Okazawa et al.

[11] Patent Number: 5,754,802
[45] Date of Patent: May 19, 1998

[54] INCREASING DATA TRANSFER EFFICIENCY FOR A READ OPERATION IN A NON-SPLIT TRANSACTION BUS ENVIRONMENT BY SUBSTITUTING A WRITE OPERATION FOR THE READ OPERATION

[75] Inventors: Koichi Okazawa, Ebina; Hideki Osaka, Hiratsuka; Kenichi Saitou, Setagaya-ku, all of Japan

[73] Assignee: Hitachi, Ltd., Tokyo, Japan

[21] Appl. No.: 648,424

[22] Filed: May 15, 1996

[30] Foreign Application Priority Data

May 14, 1995 [JP] Japan .................... 7-118314

[51] Int. Cl.[6] .................................. G06F 13/00
[52] U.S. Cl. .......................... 395/309; 395/308
[58] Field of Search ........................ 395/306–309

[56] References Cited

U.S. PATENT DOCUMENTS

| | | | |
|---|---|---|---|
| 3,997,896 | 12/1976 | Cassarino, Jr. et al. | 395/294 |
| 5,191,649 | 3/1993 | Cadambi et al. | 395/200.05 |
| 5,353,415 | 10/1994 | Wolford et al. | 395/306 |
| 5,533,204 | 7/1996 | Tipley | 395/288 |
| 5,535,340 | 7/1996 | Bell et al. | 395/292 |
| 5,544,331 | 8/1996 | Kolb | 395/308 |

FOREIGN PATENT DOCUMENTS

| | | | |
|---|---|---|---|
| 5-173936 | 7/1993 | Japan | G06F 13/28 |
| 6-131295 | 5/1994 | Japan | G06F 13/362 |

OTHER PUBLICATIONS

Nikkei Electronics 1994.6.6 (No. 609) pp. 67–97.

Primary Examiner—Jack B. Harvey
Assistant Examiner—Sumati Lefkowitz
Attorney, Agent, or Firm—Fay Sharpe Beall Fagan Minnich & McKee

[57] ABSTRACT

A method and apparatus for increasing data transfer efficiency for a read operation in a non-split transaction bus environment by substituting a write operation for the read operation. The data transfer efficiency is increased and deadlocking is reduced by substituting two write operations (one from an I/O device to a bus controller and the other from the bus controller to the I/O device) for one read operation. Further, the present invention improves the efficiency of data transfer by maintaining the compatibility of a bus specification when DMA of an I/O bus having no split transfer function, such as a PCI bus or inter-I/O transfer, is executed. A processor instructs a data transfer operation to an I/O device or bus conversion adapter. The I/O device or bus conversion adapter connected to a bus outputs a write access, and a bus connection controller connected to the bus receives the write access and reads data in a main memory. The bus connection controller then transfers read data to the I/O device or the bus conversion adapter. Such an operation may also be performed between two I/O devices or bus conversion adapters.

7 Claims, 5 Drawing Sheets

451 ··· MODE SETTING REGISTER
452 ··· REQUEST ADDRESS SETTING REGISTER
453 ··· RETURN ADDRESS SETTING REGISTER
461 ··· REQUEST ADDRESS SETTING REGISTER

| ADDRESS | REQUEST ADDRESS (QA) |
|---------|----------------------|
| DATA 1  | READ ADDRESS (DA)    |
| DATA 2  | RETURN ADDRESS (TA)  |

451 ··· MODE SETTING REGISTER
452 ··· REQUEST ADDRESS SETTING REGISTER
453 ··· RETURN ADDRESS SETTING REGISTER
461 ··· REQUEST ADDRESS SETTING REGISTER

INCREASING DATA TRANSFER EFFICIENCY FOR A READ OPERATION IN A NON-SPLIT TRANSACTION BUS ENVIRONMENT BY SUBSTITUTING A WRITE OPERATION FOR THE READ OPERATION

BACKGROUND OF THE INVENTION

The present invention relates to a data transfer system and a device relating to it, that is, a data transfer system used for an information processor such as a personal computer, a work station, or an office computer and more particularly to a data transfer system and a device relating to it for improving the bus use efficiency when each module transmits and receives data via a bus having no split transfer function.

In an information processor such as a personal computer, as a conventional data transfer method, a so-called direct memory access (hereinafter abbreviated to DMA) is carried out.

The DMA is a method that, for example, an I/O device and a bus conversion adapter become a bus master of the system bus respectively and the I/O device or the bus conversion adapter executes read or write access to the main memory according to the setting of the main CPU so as to transfer data between the I/O device or the bus conversion adapter and the main memory. In this case, the system bus is, for example, a PCI bus (peripheral component interconnect bus) and the I/O device is possibly a disk control unit or network control unit connected to the system bus. The bus conversion adapter is a device for connecting a low order bus such as an EISA bus.

An art with respect to this DMA is described in, for example, Japanese Patent Application Laid-Open 5-173936 (Prior Art 1).

Recently, an inter-I/O transfer method for directly transferring data between I/O devices or bus conversion adapters by applying the aforementioned DMA method to a plurality of I/O devices or bus conversion adapters has also been used.

With respect to an art for applying this DMA method to a plurality of I/O devices or bus conversion adapters, an inter-I/O transfer by an extension bus having no split transfer function such as a PCI bus is described in, for example, Japanese Patent Application Laid-Open 6-131295 (Prior Art 2).

"Split transfer" is a transfer method of transferring data by splitting the read access into two accesses such as a request of address transfer and a return of data transfer and it is a method of improving the use efficiency of bus by executing another access on the bus during the two accesses of request and return.

A bus to which the present invention is applied is a bus having no split transfer function such as a PCI bus and a system having one or a plurality of I/O buses having no split transfer function such as a PCI bus is described in "PCI As New Industrial Standard Of I/O Bus", Nikkei Electronics, Jun. 6, 1994 Issue (No. 609), p. 67–96.

SUMMARY OF THE INVENTION

The Prior Art 1 is an art with respect to DMA of directly transferring data between the main memory and the I/O device and the Prior Art 2 is an art of transferring data between I/O devices connected to a plurality of extension buses having no split transfer function.

In an information processor in recent years, as processing of a large amount of data such as video data increases, increasing of the speed of data transfer in an information processor using a system bus is a big problem. However, in a personal computer, increasing of the speed by modifying the system bus such as a PCI bus is restricted due to maintaining of the compatibility and it is necessary to improve the efficiency of data transfer with the compatibility of the bus specification maintained.

However, in DMA of the Prior Art 1 or inter-I/O transfer of the Prior Art 2, both of read access and write access are executed viewed from the I/O device which is a bus master or the bus conversion adapter. In this case, a problem arises that in a system bus having no split transfer function such as a PCI bus, the data transfer efficiency of read access is worse than that of write access. The reason is that in a system bus having no split transfer function such as a PCI bus, during the period from output of an address to the system bus for read access to output of data, the bus is occupied unnecessarily.

In inter-I/O transfer in a system bus having a plurality of I/O buses having no split transfer function such as a PCI bus, it is pointed out that if read accesses from a plurality of extension buses are in contention, there is a possibility of occurrence of a deadlock as described also in the Prior Art 2. The Prior Art 2 takes a countermeasure of preventing read accesses from occurring in a plurality of extension buses at the same time for it.

Buses having a transfer retry function can take a countermeasure of retrying read accesses occurring at the same time. However, a problem arises that since read accesses are suppressed in either case, the data transfer efficiency gets worse.

The present invention is designed to eliminate the difficulties of the prior arts mentioned above and an object thereof is to provide a means for eliminating a possibility of occurrence of a deadlock and improving the efficiency of data transfer by maintaining the compatibility of the bus specification when DMA of an I/O bus having no split transfer function such as a PCI bus or inter-I/O transfer is executed.

The present invention is a data transfer system for connecting each module by a bus and transferring data, and the system comprises a main memory, a processor bus connected to the main memory, a bus connection controller connected to the processor bus, a system bus connected to the bus connection controller, and an I/O device or a bus conversion adapter connected to the system bus, and the I/O device or the bus conversion adapter executes write access to the bus connection controller via the system bus, and the bus connection controller receives the write access, reads data from the main memory, and executes write access to the I/O device or the bus conversion adapter so as to transfer the data of the main memory to the I/O device or the bus conversion adapter.

The data transfer system of the present invention has a processor connected to the processor bus, and the processor issues an operation instruction to the I/O device or the bus conversion adapter, and the I/O device or the bus conversion adapter executes write access to the bus connection controller according to the operation instruction.

In the data transfer system of the present invention, the bus connection controller has a storage portion for storing data outputted by the write access from the I/O device or the bus conversion adapter.

In the data transfer system of the present invention, the data outputted by the write access to the bus connection controller from the I/O device or the bus conversion adapter includes a request address indicating the address of the storage portion of the bus connection controller, a read address indicating the address when the bus connection controller reads data from the main memory, and a return address indicating the address when data transferred to the I/O device or the bus conversion adapter from the bus connection controller is stored.

In the data transfer system of the present invention, the bus connection controller has a request queue for queuing the write access and a first request register for setting an address of the request queue by the request address and the I/O device or the bus conversion adapter has a second request address setting register for setting a request address which is the address of the request queue to which the write access of the bus connection controller is executed and a return address setting register for setting an address indicating the destination of the write access outputted by the bus connection controller.

In the data transfer system of the present invention, upon receipt of a read access request from the I/O device or the bus conversion adapter, the system bus is a bus occupied by the corresponding read access during the period from the read access request to output of data according to the read access request to the I/O device or the bus conversion adapter.

In the data transfer system of the present invention, the bus connection controller executes read access to the main memory by the read address outputted as write access data from the I/O device or the bus conversion adapter and stores the return address for the I/O device or the bus conversion adapter in the request queue.

In the data transfer system of the present invention, when an error occurs in the read access to the main memory, the bus connection controller assigns an error code to a return address indicating the address of write access to the I/O device or the bus conversion adapter.

By doing this, write access is executed to the bus connecting each module two times instead of read access being executed once. Namely, when a read access request is issued from the I/O device to the main memory, the bus is generally occupied during the period from the read access request until data is read from the main memory by the read access request and the data is transferred to the I/O device. However, according to the present invention, the bus can be released by executing write access to the bus connection controller from the I/O device, so that the released bus can be used for data transfer to another I/O device. Therefore, even if a bus having no split transfer function is used, a defect that the bus is occupied unnecessarily during read access can be avoided, and the bus use efficiency can be increased, and the data transfer efficiency can be increased.

When this protocol is used, even if data is transferred by using a plurality of buses, a deadlock will not occur.

Furthermore, the same bus specification as the conventional one can be used, so that a system having the compatibility with the conventional bus can be constructed.

According to the present invention, a plurality of I/O devices or bus conversion adapters are switched to the bus master alternately, so that a plurality of read accesses can be executed in parallel with substituting write accesses on the system bus. Furthermore, an I/O device or a bus conversion adapter can execute read access continuously in parallel with substituting write access without waiting for reception of data, so that the system bus use efficiency viewed from each I/O device or bus conversion adapter can be increased.

DESCRIPTION OF THE PREFERRED EMBODIMENTS

The embodiments of the present invention will be explained hereunder with reference to FIGS. 1 to 6.

Firstly, the system constitution of the data transfer system will be explained by referring to FIG. 1.

Figures 1, 2:
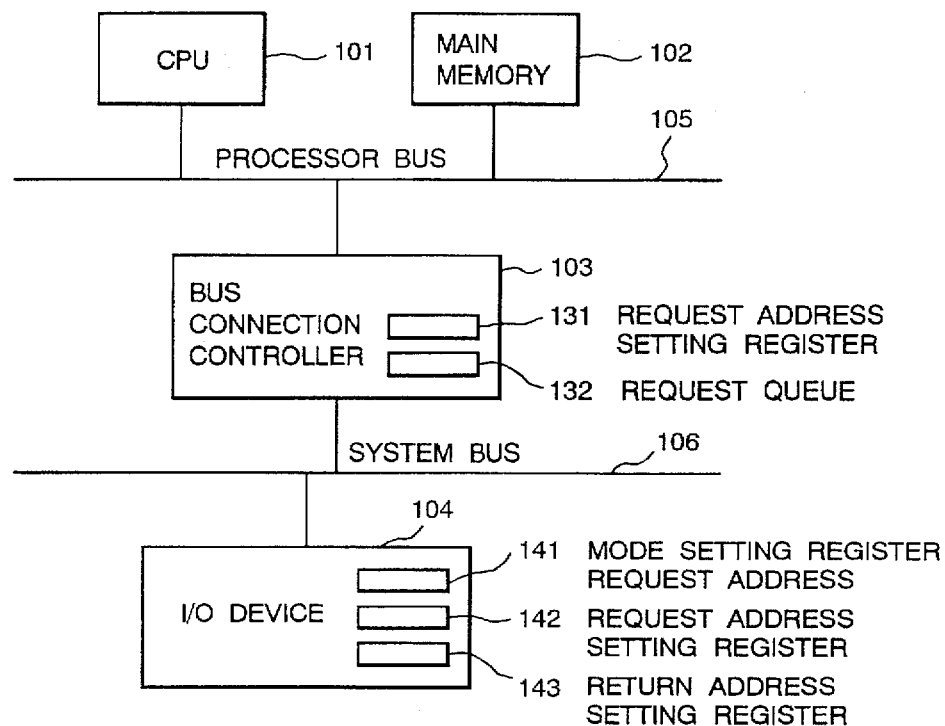
FIG. 1 is a system block diagram showing the hardware constitution of the data transfer system of the present invention.
FIG. 2 is a schematic diagram showing the access format of write access for request.

FIG. 1 is a system block diagram showing the hardware constitution of the data transfer system of the present invention.

The present invention will be explained hereunder using a case that data stored in a main memory 102 is transferred to an I/O device 104 by DMA transfer.

A main CPU 101 and the main memory 102 are connected to a bus connection controller 103 by a processor bus 103 and data can be transmitted or received between the three devices.

The bus connection controller 103 and the I/O device 104 are connected to each other by a system bus 106 and data can be transmitted or received between them. The I/O device has a bus master function. The system bus 106 is a system bus such as, for example, a PCI bus having no split transfer function.

The bus connection controller 103 has a request address setting register 131 and a request queue 132.

On the other hand, the I/O device 104 has a mode setting register 141, a request address setting register 142, and a return address setting register 143.

The request address setting register 131, the mode setting register 141, the request address setting register 142, and the return address setting register 143 are assigned addresses on the system bus 106 and can be accessed via the system bus 106.

The mode setting register 141 is a flag register, which is set to ON when DMA transfer is executed by the data transfer method of the present invention and set to OFF when it is not executed. By default, it is set to OFF.

In this embodiment, the I/O device 104 is considered as an object of DMA. However, the same operation is available for the bus connection adapter.

In data transfer of the present invention, special operations are performed by the request address setting register 131 and the request queue 132 in the bus connection controller 103 and the mode setting register 141, the request address setting register 142, and the return address setting register 143 in the I/O device 104. However, functions other than the functions of the data transfer method of the present invention may be the same as those of the prior art.

Although not shown in FIG. 1, the bus connection controller 103 and the I/O device 104 have a sequencer for controlling the data transfer operation in the same way as with the prior art.

Next, the operation of the data transfer system will be explained by referring to FIGS. 2, 5, and 6 in addition to FIG. 1.

Firstly, the main CPU 101 sets a request address in the request address setting register 131 in the bus connection controller 103 and the request address setting register 142 in the I/O device 104.

This request address is used to issue a request to the bus connection controller 103 from the I/O device 104 and access the request queue 132 in the bus connection controller 103.

The main CPU 101 sets a return address in the return address setting register 143 in the I/O device 104. This return address is the address of the storage location when the bus connection controller 103 sends data of the main memory 102 to the I/O device 104. The main CPU 101 changes and sets the mode setting register 141 to ON.

The initialization is completed now.

The operation of the data transfer system varies with the value of the mode setting register 141.

When the value of the mode setting register 141 is OFF, the data transfer system performs the normal operation. Namely, when the I/O device 104 is instructed to execute DMA read access from the main CPU 101, the system executes DMA read access in the same way as with the prior art.

Therefore, when the value of the mode setting register 141 is OFF, the I/O device 104 can operate in compatibility with a conventional interface even on a system in which the method of the present invention is not executed.

When the mode setting register 141 is ON, the data transfer system performs the operation of the data transfer method of the present invention.

When the I/O device 104 is instructed to execute DMA read access from the main CPU 101 in this case, the device executes write access to the request address set in the request address setting register 142 instead of read access.

Next, the access format outputted from the I/O device 104 at this time will be explained by referring to FIG. 2.

FIG. 2 is a schematic diagram showing the access format of write access for request.

The access format comprises an address of one word at the beginning and data of 2 words behind it as a write access format.

In this format, the request address (QA) set in the request address setting register 142 in the I/O device 104 is outputted as an address first and then the read address (DA) and the return address (TA) set in the return address setting register 143 are outputted as data. The read address (DA) indicates the address of the main memory for read access.

When write access in the aforementioned access format is issued via the system bus 106 and the address of the request address (QA) matches with the address stored in the request address setting register 131, the bus connection controller 103 judges it as "write access substituting for read access" (it is write access viewed from the I/O device 104 but aims at write access really; hereinafter the access procedure of the data transfer method of the present invention is referred to as it) and receives data.

The processor bus 105 receives this request, issues read access at the read address (DA) sent as data, and stores the return address (TA) in the request queue 132.

When the request queue 132 is saturated in this case (the queue is full and no more data can be stored), the processor bus 105 refuses the request by a means such as returning a retry response.

By this read access at the read address (DA), data is sent to the bus connection controller 103 from the main memory 102.

Next, the bus connection controller 103 becomes a bus master of the system bus 106 and executes write access in a format that data sent from the main memory 102 is added behind the return address (TA) stored in the request queue 132 which is set as an address.

When an error such as an ECC error (error checking code error) or a bus parity error occurs in the main memory 102, the bus connection controller 103 informs the I/O device 104 of the error by a means such as executing write access in a format that an error code is added to the return address (TA).

When the return address (TA) set in the return address setting register 143 in the I/O device 104 is write-accessed via the system bus 106, the I/O device 104 judges it as write access substituting for read access of the present invention and receives the data of the main memory 102 corresponding to the read address (DA).

By doing this, one read access generated on the system bus 106 is substituted by two write accesses including write access to the bus connection controller from the I/O device and write access to the I/O device from the bus connection controller. In this case, the two write accesses can be seen as general write access on the system bus, so that the interface compatibility with general write access can be maintained.

The sequencer in the I/O device 104 just performs an operation of outputting the read address (DA) and receiving data corresponding to it. Therefore, although read access to the system bus 106 is issued in the general procedure, it is desirable to just convert it to write access of the method of the present invention. Therefore, to realize a function other than it, it is desirable to just allow the sequencer to operate in the same way as with the prior art.

Next, the I/O device 104 for playing an important part of the system and the sequence operation of the sequencer of the bus connection controller 103 will be explained with reference to FIGS. 5 and 6 according to the procedure of the data transfer method of the aforementioned system.

Figure 5:
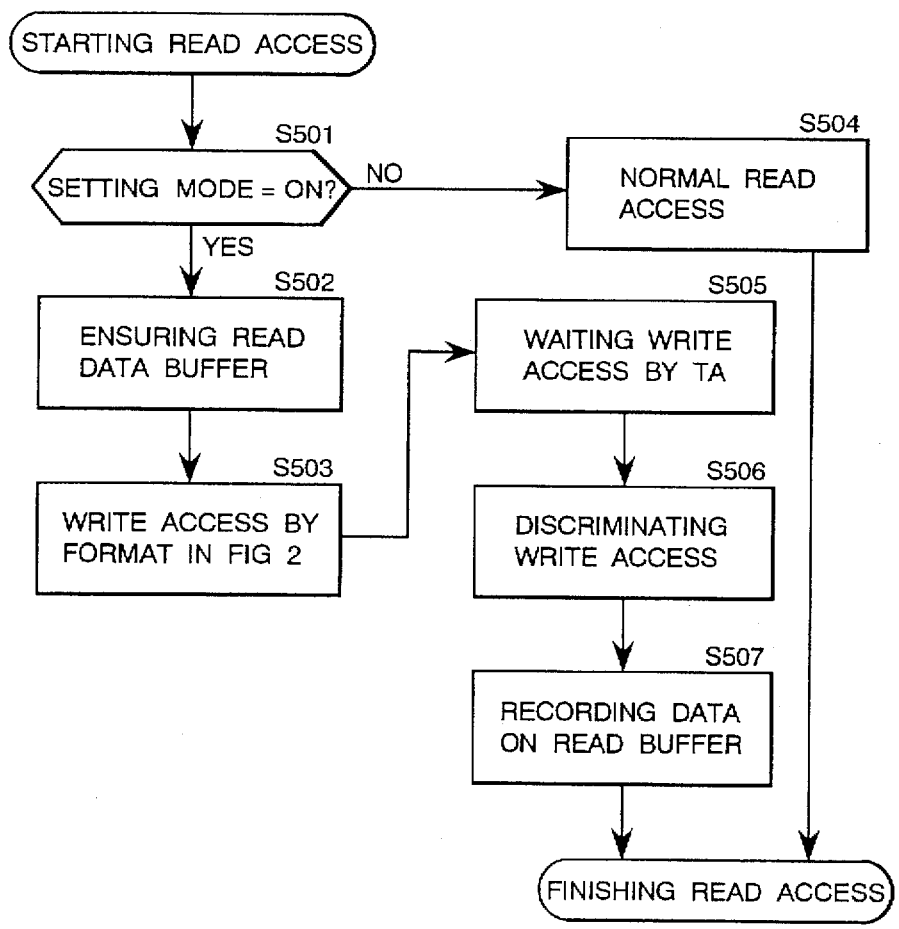
FIG. 5 is a flow chart showing the sequence operation of the sequencer in the I/O device 104 when DMA transfer of the data transfer system of the present invention is executed.

FIG. 5 is a flow chart showing the sequence operation of the sequencer in the I/O device 104 when DMA transfer of the data transfer system of the present invention is executed.

Figure 6:
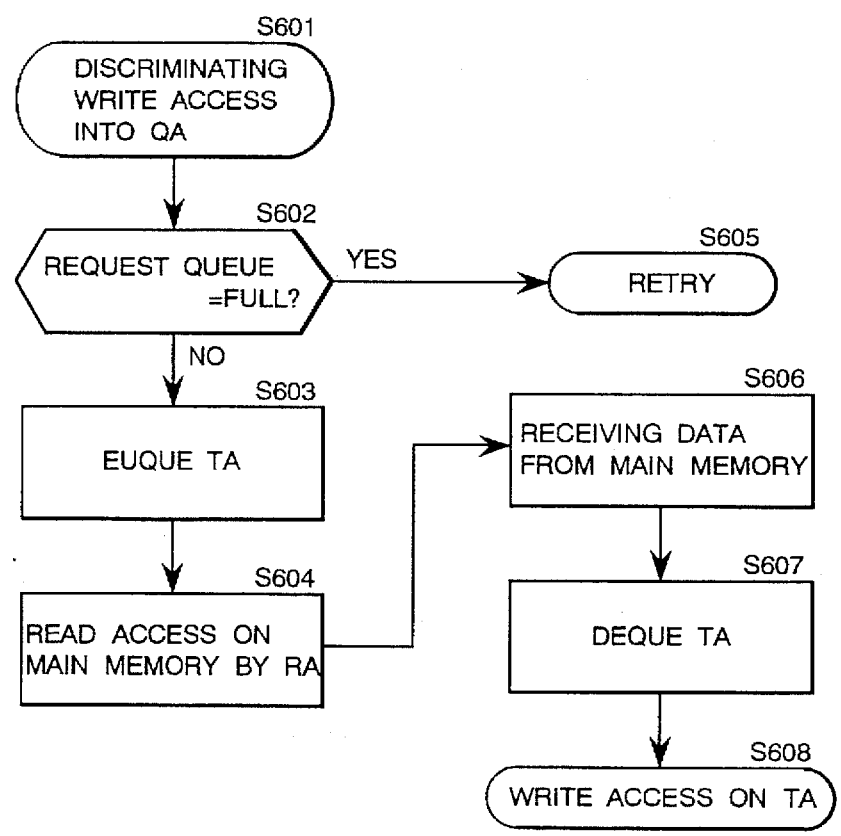
FIG. 6 is a flow chart showing the sequence operation of the sequencer in the bus connection controller 103 when DMA transfer of the data transfer system of the present invention is executed.

FIG. 6 is a flow chart showing the sequence operation of the sequencer in the bus connection controller 103 when DMA transfer of the data transfer system of the present invention is executed.

As shown in FIG. 5, when read access starts, the sequencer in the I/O device 104 checks first whether the mode setting of the mode setting register 141 is ON or not (Step 501).

When the mode setting is OFF, the sequencer performs the sequence operation of general read access (Step 504).

When the mode setting is ON, the sequencer starts the sequence operation of write access substituting for read access by the data transfer method of the present invention.

In this case, the sequencer ensures the read data buffer first in the same way as with general read access (Step 502).

Next, the sequencer executes write access in the access format explained with reference to FIG. 2 by the same sequence operation as that of general write access (Step 503). The sequencer waits for the bus connection controller 103 to execute write access by the return address (TA) (Step 505).

When the bus connection controller 103 executes write access by the return address (TA) and the I/O device 104 discriminates it, the sequencer stores data sent from the main memory 102 in the ensured read buffer and ends the read access.

On the other hand, as shown in FIG. 6, the bus connection controller 103 discriminates write access to the request address (QA) in the access format shown in FIG. 2 at Step 503 (Step 601).

In this case, the bus connection controller 103 checks first whether the internal request queue 132 is full or not (Step 602). When the request queue 132 is full, the bus connection controller 103 outputs a retry response (Step 605).

When the request queue 132 is not full, the bus connection controller 103 accepts write access and enqueues the return address (TA) in the request queue 132 (Step 603). The bus connection controller 103 executes read address to the main memory 102 at the address indicated by the read address (DA) by the same sequence operation as general read access.

Upon receipt of data from the main memory (Step 606) by this read access, the bus connection controller 103 dequeues the return address (TA) from the request queue 132 (Step 607) and executes write access to the return address (TA) by the same sequence operation as general write access (Step 608).

By doing this, the present invention can execute DMA transfer by substituting write access for read access in compatibility with a conventional sequencer interface.

Next, characteristics of the present invention will be explained by considering the timing of the data transfer method of the present invention by referring to FIG. 3.

FIG. 3 is a timing chart showing data timing for executing. DMA in comparison of the method by the prior art with the method of the present invention. (a) indicates the data timing by the prior art and (b) indicates the data timing of the present invention. Also in this case, the system bus is a system bus having no split transfer function such as a PCI bus.

In this embodiment, the system bus is of a clock synchronization type and the DMA read access requires 8 clock cycles between output of an address to the system bus and output of data. (C10 to C2 correspond to 8 clocks.)

In this embodiment, the unit of one read access is set at, for example, 4 words. (Data from C10 to C13)

Figures 3A, 3B:
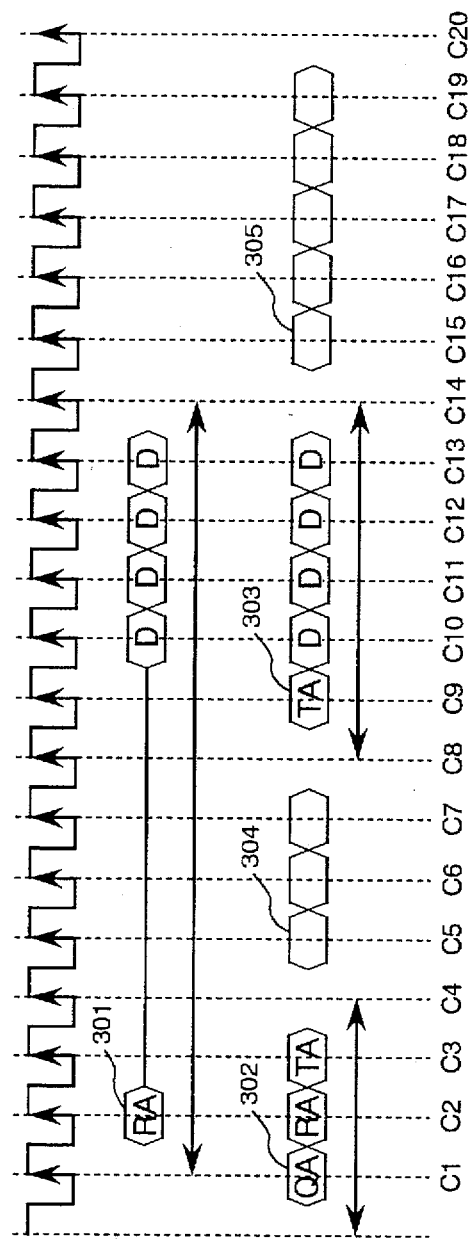
FIG. 3 is a timing chart showing data timing for executing DMA in comparison of the method by the prior art with the method of the present invention. (a) indicates the data timing by the prior art and (b) indicates the data timing of the present invention.

Numeral 301 shown in FIG. 3(a) indicates timing of address and data indicating the DMA read access by the prior art.

In the timing of 301, the system bus is occupied for 13 clock cycles from output of the read address (RA) as an address at C2 to output and end of the data (D) at C13.

On the other hand, as shown in FIG. 3(b), in the data transfer of the present invention, read access equivalent to 301 is substituted by two write accesses of 302 and 303. As explained above, in the write access substituting for read access of the present invention, the request address (QA) is outputted as an address first at 302 and then the read address (RA) and the return address (TA) are outputted as data.

Response data to the write access 302 is transferred as write access 303. In this case, the period from output of the read address (RA) at 302 to data output at 303 is 8 clock cycles.

Therefore, according to the data transfer method of the present invention, the system bus is occupied for 10 clock cycles of 302 and 303. As shown by 304 in FIG. 3(b), another transfer can be executed on the system bus between 302 and 303.

Therefore, when the efficiency of the system bus by the data transfer method of the DMA access by the prior art is compared with that of the DMA access of the present invention, the use efficiency of the system bus of the present invention is higher by about 23% (=3/13).

According to the data transfer method of the present invention, the time occupying the system bus by one access is shorter such as 4 clock cycles at 302 and 6 clock cycles at 303 than 13 clock cycles at 301. Therefore, from a mean point of view by arbitration, there is an advantage that the waiting time for acquiring a bus becomes shorter.

If the I/O device 104 can control a plurality of read data buffers ensured at Step 502 shown in FIG. 5 and the sequence operation explained in FIG. 5 can be reinputted (reentrant), the I/O device 104 can execute a plurality of read accesses in parallel by executing accesses at 302 and 303 shown in FIG. 3 as well as the same accesses in the timing of 304 and 305. By doing this, one I/O device can execute a plurality of read accesses in parallel, so that the use efficiency of the system bus viewed from each I/O device can be increased.

Another embodiment will be explained by referring to FIG. 4.

The first embodiment relates to a method of executing DMA transfer between the main memory and the I/O device. On the other hand, this embodiment relates to a method of executing data transfer between an I/O device and an I/O device.

Firstly, the system constitution of the data transfer system of the second embodiment of the present invention will be explained by referring to FIG. 4.

Figure 4:
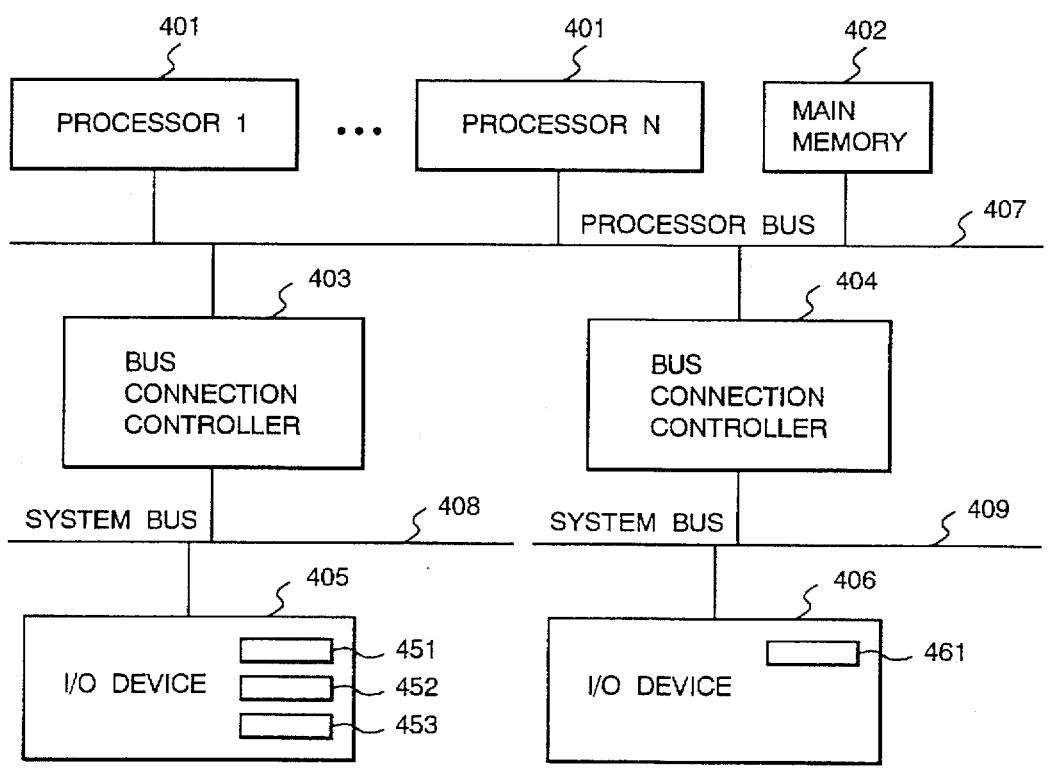
FIG. 4 is a system block diagram showing the hardware constitution of the second data transfer system of the present invention.

FIG. 4 is a system block diagram showing the hardware constitution of the data transfer system of the second embodiment of the present invention.

A processor 401 comprises N processors as a multiprocessor. The processor 401 and a main memory 402 are connected to bus connection controllers 403 and 404 via a processor bus 407 and data can be transmitted and received between them.

The bus connection controller 403 is connected to an I/O device 405 via a system bus 408 and the other bus connection controller 404 is connected to an I/O device 406 via a system bus 409.

The I/O devices are modules which are a request source and a request destination for inter-I/O transfer.

There are a plurality of system buses constituting the system of this embodiment as mentioned above and it is assumed that each system bus has no split transfer function such as a PCI bus.

The I/O device 405 has a mode setting register 451, a request address setting register 452, and a return address setting register 453. The other I/O device 406 has a request address setting register 461.

In this embodiment, special operations are performed by these registers in the I/O devices. However, general functions other than them may be the same as those of the prior art.

Although not shown in FIG. 4, the I/O devices 405 and 406 have sequencers for controlling the data transfer operation in the same way as with the prior art. In this embodiment, the system buses 408 and 409 are assigned an exclusive address space and mutual access can be executed only by designation of an address.

The mode setting register 451, the request address setting register 452, and the return address setting register 453 are assigned addresses on the system bus 408, and the request address setting register 461 is assigned an address on the system bus 409, and they can be accessed from the system buss 408 and 409.

As in the first embodiment, the mode setting register 451 is a flag register and it is required that the flag is set to ON when inter-I/O transfer is executed by the data transfer method of the present invention and set to OFF when it is not executed.

Next, the operation of the data transfer system of the present invention will be explained also by referring to FIG. 4.

Firstly, the processor 401 sets a request address in the request address setting register 461 in the I/O device 406 and in the request address setting register 452 in the I/O device 405.

This request address is used to output a request to the I/O device 406 from the I/O device 405.

The processor 401 sets a return address in the return address setting register 453 in the I/O device 405. This return address is the address of the storage location when the I/O device 406 sends data retained by it to the I/O device 405. The processor 401 changes and sets the mode setting register 451 to ON.

The initialization is completed now.

The operation of the data transfer system varies with the value of the mode setting register 451 which is set just now.

When the value of the mode setting register 451 is OFF, the data transfer system performs the normal operation. Namely, when the I/O device 405 is instructed to execute inter-I/O transfer read access from the processor 401, the system executes inter-I/O transfer read access in the same way as with the prior art.

Therefore, when the value of the mode setting register 451 is OFF, the I/O device 405 can operate in compatibility with a conventional interface even on a system in which the method of the present invention is not executed.

When the mode setting register 451 is ON, the data transfer system performs the operation of the data transfer method of the present invention.

When the I/O device 405 is instructed to execute inter-I/O transfer read access from the processor 401 in this case, the device executes write access to the request address set in the request address setting register 451 instead of read access.

As an access format at this time, the same one as that explained by referring to FIG. 2 in the first embodiment may be used.

Namely, this is a format that there is the request address (QA) set in the request address setting register 452 in the I/O device 405 as an address first and there are the read address (DA) and the return address (TA) set in the return address setting register 453 as data behind it.

The read address (DA) indicates the address of the data storage location of the I/O device for read access.

When write access in the aforementioned access format is issued via the system bus 408, the bus connection controller 403 informs the other bus connection controller 404 of this data from the processor 407.

The bus connection controller 404 informs the I/O device 406 of this data via the system bus 409.

When the address of the request address (QA) matches with the address stored in the request address setting register 461, the I/O device 406 judges it as "write access substituting for read access" of the present invention and receives data.

The I/O device 406 executes write access to the address data of the requested read data (RD) on the system bus 409 with the header assigned the return address (TA).

This data is sent to the bus connection controller 403 via a route of the bus connection controller 404 and the processor 407.

The bus connection controller 403 becomes a bus master of the system bus 408 and executes write access by sent data.

When the return address (TA) set in the return address setting register 453 in the I/O device 405 is write-accessed via the system bus 408, the I/O device 405 judges it as write access substituting for read access of the present invention and receives the data of the I/O device 406 corresponding to the read address (DA).

By doing this, one read access generated on the system bus 408 is substituted by two write accesses including one write access to each of the I/O device 405 and the I/O device 406. In this case, the two write accesses can be seen as general write access on the system bus 408 and the system bus 409, so that the interface compatibility with general write access can be maintained.

The sequencer in the I/O device 405 just performs an operation of outputting the read address (DA) and receiving data corresponding to it. Therefore, although read access to the system bus 408 is issued in the general procedure, it is desirable to just convert it to write access of the method of the present invention. Therefore, to realize a function other than it, it is desirable to just allow the sequencer to operate in the same way as with the prior art.

In the aforementioned inter-I/O transfer operation, the bus connection controllers 403 and 404 perform only the same operation as that of the prior art. However, also the bus connection controller for performing the DMA operation of the present invention explained in the first embodiment can be applied as this bus connection controller.

It is obvious that in the I/O device 406, a queue means which is the same as the request queue 132 in the bus connection controller 103 shown in FIG. 1 in the first embodiment can be installed and an I/O device having a function which can serve both as a request source and a request destination of inter-I/O transfer can be structured.

According to the present invention, when DMA or inter-I/O transfer of an I/O device having no split transfer function such as a PCI bus is executed, a means for eliminating a possibility of occurrence of a deadlock, maintaining the compatibility of the bus specification, and improving the data transfer efficiency can be provided.

What is claimed is:

1. A data transfer system for transmitting data between modules connected by a bus, comprising:

a main memory;

a processor bus connected to said memory;

a bus connection controller connected to said processor bus;

a system bus connected to said bus connection controller;

an I/O device connected to said system bus, said I/O device executing a write access to said bus connection controller via said system bus;

said bus connection controller receiving said write access, reading data from said main memory, and executing said write access so as to transfer said data to said I/O device, said bus connection controller including a storage portion for storing said data outputted by said write access;

a processor connected to said processor bus, said processor issuing an operation instruction to said I/O device, and said I/O device executing said write access to said bus connection controller according to said operation instruction;

said data outputted by said write access including:
- a request address indicating the address of said storage portion of said bus connection controller,
- a read address indicating the address where said bus connection controller reads said data from said main memory, and
- a return address indicating the address where said data transferred to said I/O device from said bus connection controller is stored;

said bus connection controller further including:
- a request queue for queuing said write access to said bus connection controller, and
- a first request register for setting an address of said request queue by said request address; and said I/O device including:
- a second request address setting register for setting a request address which is the address of said request queue to which said write access to said bus connection controller is executed, and
- a return address setting register for setting an address indicating the destination of said data outputted by said bus connection controller.

2. A data transfer system according to claim 1, wherein upon receipt of a read access request from said I/O device, said system bus is occupied by said read access request during a period from said read access request until output of data according to said read access request to said I/O device.

3. A data transfer system according to claim 1, wherein said bus connection controller executes a read access to said main memory by said read address outputted as write access data from said I/O device and stores the return address for said I/O device in said request queue.

4. A data transfer system according to claim 3, wherein when an error occurs in said read access request to said main memory, said bus connection controller assigns an error code to a return address indicating the address of write access to said I/O device.

5. A data transfer system according to claim 1, wherein said I/O device is a bus conversion adapter.

6. A data transfer system for transmitting data between modules connected by a bus, comprising:
- a processor bus;
- a first and a second bus connection controller connected to said processor bus;
- a first system bus connected to said first bus connection controller and a second system bus connected to said second bus connection controller;
- a first I/O device connected to said first system bus and a second I/O device connected to said second system bus, said first I/O device executing a write access to said first bus connection controller via said first system bus;

said first bus connection controller receiving said write access from said first I/O device, reading data from said second I/O device via said processor bus and said second bus connection controller, and executing said write access so as to transfer said data of said second I/O device to said first I/O device, said first bus connection controller including a storage portion for storing said data outputted by said write access;

a processor connected to said processor bus, said processor issuing an operation instruction to said first I/O device, and said first I/O device executing said write access to said first bus connection controller according to said operation instruction;

said data outputted by said write access including:
- a request address indicating the address of said storage portion of said first bus connection controller,
- a read address indicating the address where said first bus connection controller reads said data from said second I/O device, and
- a return address indicating the address where data transferred to said first I/O device from said first bus connection controller is stored;

said first I/O device including:
- a first request address setting register for setting a request address which is the address of a request queue to which said write access to said bus connection controller is executed, and
- a return address setting register for setting an address indicating the destination of said data outputted by said first bus connection controller; and said second I/O device including:
- a second request address setting register for setting a second request address for discriminating said write access from said first I/O device.

7. A data transfer system according to claim 6, wherein said first I/O device is a bus conversion adapter.

* * * * *